Oct. 6, 1959
G. S. SIMMONS, JR., ET AL
2,907,354
MOUNTING FOR PICKER STICK
Filed July 6, 1956
2 Sheets-Sheet 2
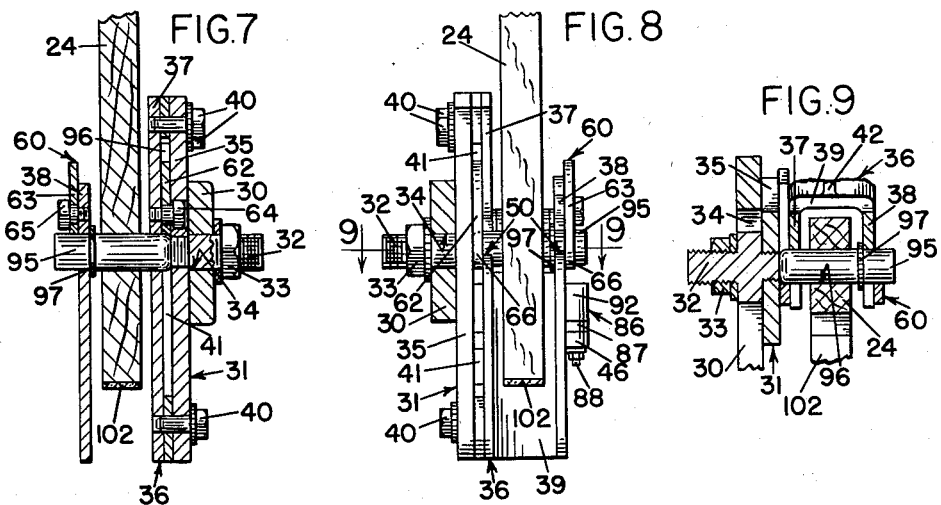
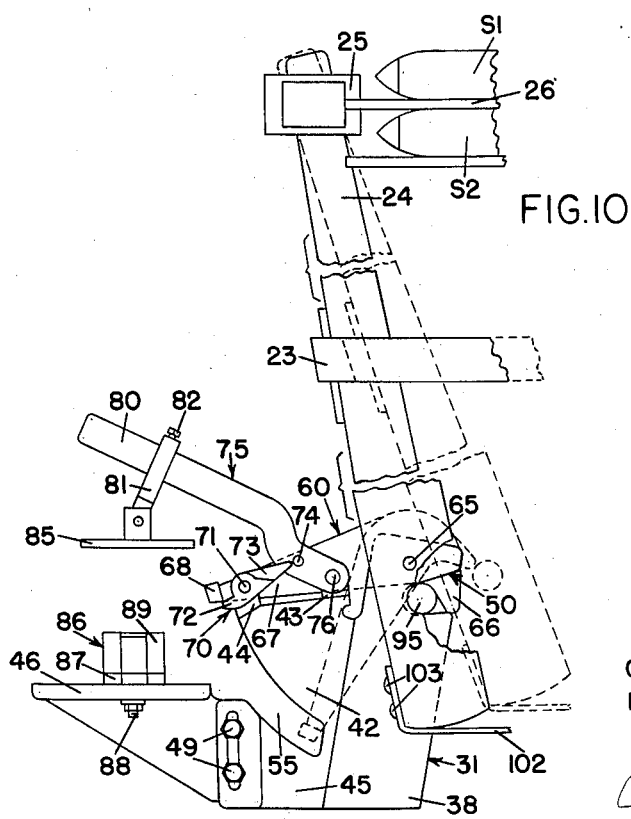
INVENTORS
GEORGE S. SIMMONS JR.
RICHARD G. TURNER
Charles T. Hawley
ATTORNEY

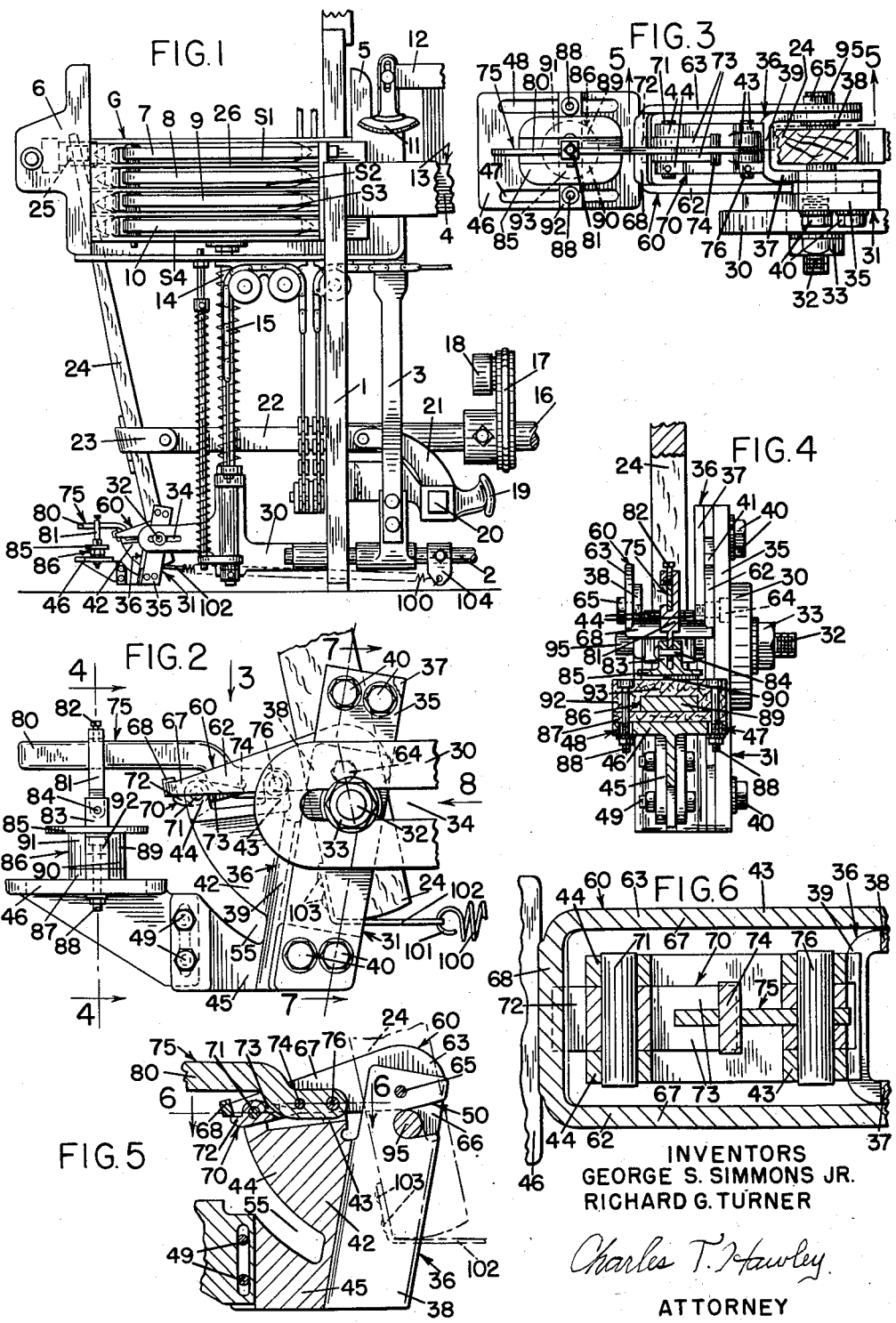

United States Patent Office 2,907,354
Patented Oct. 6, 1959

2,907,354

MOUNTING FOR PICKER STICK

George S. Simmons, Jr., Leicester, and Richard G. Turner, Worcester, Mass., assignors to Crompton & Knowles Corporation, Worcester, Mass., a corporation of Massachusetts Application July 6, 1956, Serial No. 596,327

6 Claims. (Cl. 139—156)

This invention relates to mounting means for picker sticks in looms and it is the general object of the invention to provide an improved giveway means which will yield to prevent breakage of the stick if abnormal conditions for picking exist in the loom.

The usual fly shuttle loom employs a picker stick the lower end of which is mounted in one way or another for pivotal movement and the upper end of which has driving relation with a shuttle. In drop box looms the stick ordinarily cooperates with a picker which it moves in a path registering with the shuttle box or cell in active position. If for any reason a shuttle box shift is not correct the picker may be aligned with part of the drop box structure instead of with a shuttle and an abnormal picking condition exists. In such an event the picking mechanism will exert an excessive force on the stick which may break the stick.

Various devices have been proposed heretofore to permit the pivotal mounting of the stick to yield under such abnormal conditions but they have generally been made in such manner that resetting the stick to its normal position has been difficult. This is particularly true where heavy springs are used to cause a two-part bearing to hold the pivot stud of the stick.

It is an important object of the invention to provide a yieldable mounting for the stick pivot stud employing a force transmitting or conversion system of parts connected to one part at least of a two-part bearing for the stud and connected also to one of two elements which when in close engagement requires a given force to separate them but which when separated have negligible tendency to return to normal engaging position. In the example of the invention to be set forth hereinafter one of the elements is a permanent magnet and the other element is an armature for the magnet, but the invention is not limited to these specific elements.

In the operation of the invention the aforesaid given force will be sufficient to cause the system to hold the two-part bearing in stud retaining position when the picking mechanism exerts a normal picking force on the stick, but if an excessive force is exerted on the stick the system will exert a force on the movable element in excess of said given force and the elements will separate. Under these conditions the system will be unable to cause the bearing to retain the stud and the latter will escape from the bearing, thereby preventing breakage of the stick. Neither of the elements is damaged in any way when they separate. It is for this reason that after the stud has been returned to the bearing and the system restored to normal that the two elements can be returned to their normal engaging position without renewal of any parts and with a minimum of effort on the part of the weaver. This latter fact is due to elimination of the previously used heavy springs and their replacement by the elements and the force transmitting system.

As an example of the invention one form thereof is shown in the accompanying drawings wherein:

Fig. 1 is a front elevation of one end of a drop box loom having the invention applied thereto with the parts in normal position, Fig. 2 is an enlarged front elevation of the structure shown at the lower left-hand part of Fig. 1, Fig. 3 is a plan view looking in the direction of arrow 3, Fig. 2, Fig. 4 is a vertical section on line 4—4, Fig. 2, Fig. 5 is a vertical section on line 5—5, Fig. 3, parts being broken away, Fig. 6 is an enlarged horizontal section on line 6—6, Fig. 5, Fig. 7 is a generally vertical section on line 7—7, Fig. 2, Fig. 8 is a side elevation looking in the direction of arrow 8, Fig. 2, Fig. 9 is a horizontal section on line 9—9, Fig. 8, and Fig. 10 is a diagrammatic view illustrating the operation of the invention.

Referring particularly to Fig. 1, the loom frame 1 supports a rocker shaft 2 on which is mounted a laysword 3 the upper end of which supports a lay 4 which oscillates back and forth in usual manner. Inner and outer box guides 5 and 6 respectively supported from the lay guide the vertical shiftings of a gang G of shuttle boxes having box cells 7, 8, 9 and 10 reading from top to bottom. A box mouth member 11 supported from the handrail 12 overhangs the raceway 13 for the shuttles S1, S2, S3 and S4 when they are active one at a time.

The gang G is supported on a box lifter rod 14 which by usual means is operatively connected to a box lifter chain 15 moved by a mechanism not shown to cause any one of the box cells 7–10 to register with the raceway 13.

The loom frame also supports a bottom shaft 16 to which is secured an arm 17 carrying a picking roll 18 for engagement with a picking cam 19 on a rockable picking shaft 20. A power arm 21 on shaft 20 is connected to a sweepstick 22 connected at its outer end to a lug strap 23 extending around a picker stick 24 the upper end of which cooperates with a picker 25 to propel a shuttle in active position. The lower end of stick 24 has a pivotal mounting to be more fully described hereinafter.

The operation of the matter thus far described the gang will be shifted according to pattern requirements and if the shuttles are properly boxed one or another of the cells 7–10 will be aligned with the raceway at the end of the box shifting period to create normal picking conditions. The parts 17–23, which can be considered as a picking mechanism, can then exert a normal picking force on the stick and cause it to pick the active shuttle in usual manner.

The gang G may not always shift properly and at the end of the box shifting period abnormal picking conditions will exist. As an example, the shuttle S1 in cell 7 may have rebounded so that its inner end is under the box mouth 11 to prevent a complete shift of gang G, leaving the floor 26 of cell 7 aligned with the picker as shown in Fig. 10. When the picking mechanism attempts to move the stick the upper end of the latter is unable to have its usual motion and the mechanism exerts a force on the stick in excess of the normal picking force. This is very likely to break the stick unless provision is made for release of the lower end of the stick from its usual position.

There may be reasons other than the one just described to cause an abnormal picking condition to exist. As used herein the abnormal condition is intended to apply to any condition which will cause the picking mechanism to exert an excessive force on the picker stick.

Referring now more particularly to the subject matter of the invention, the rocker shaft 2 has secured thereto a rocker iron 30 to which a support means 31 is secured by a stud 32 and nut 33, see Figs. 2, 3 and 7. The stud can be adjusted horizontally in a slot 34 in the rocker iron to vary the distance of the support means from the loom frame and is so made as to hold the support means in fixed position relative to the rocker iron. The support means includes a plate 35 to which stud 32 is secured and a bearing unit 36 having spaced parallel front and back plates 37 and 38 joined by a cross piece 39. Screws 40 hold the plates 35 and 37 fixed to each other but spaced to define a slot 41. A central web 42 parallel to plates 37 and 38 but intermediate their planes is fixed to the cross piece 39 and has right and left pairs of spaced upstanding bearing ears 43 and 44 respectively, see Fig. 3.

A second web 45 aligned with but spaced from web 42 extends to the left from and is fixed to the bearing unit. A platform 46 having front and back slots 47 and 48 parallel to web 45, see Fig. 3, is secured to web 45 by screws 49. The edges of plates 37 and 38 are formed with nonclosing, open-end bearing slots 50 aligned with each other and opening toward the loom frame, that is, in the direction in which the picking mechanism moves the picker stick, see Figs. 5 and 10. The parts 35–50 are fixed with respect to each other under normal conditions and can be considered collectively to form the support means 31. Screws 49 permit some vertical adjustment of the platform relative to the support means and the front plate 35 can be detached from the bearing unit by removal of screws 40. The webs 42 and 45 are separated by a space or slot 55 for a purpose to be described.

A first lever means 60 has front and back members 62 and 63 respectively, rockable on aligned pivot studs 64 and 65 screwed into plates 37 and 38 respectively. Members 62 and 63 have short stud confining arms 66 and have longer arms 67 jointed by a cross bar 68. The short stud arms are normally disposed as shown in Fig. 5 to substantially close the open bearing slots 50.

A second lever means 70 is pivoted on a pin 71 secured in the left-hand pair of bearings 44, see Fig. 3, and has a short release arm 72 under and engaging the cross bar 68. Longer arms 73 extending to the right, Figs. 3 and 5, are parts of lever 70 and lie under studs or pins 74 on a third lever means 75 pivoted on a pin 76 held in the right-hand pair of bearing ears 43, see Figs. 3 and 4.

The third lever means has an arm 80 along which a hanger 81 is adjustable and held in adjusted position by set screw 82. The lower end of the hanger is pivoted between ears 83 on a pin 84 and a flat plate 85 of magnetic material, such as iron or steel, is fixed to the ears 83. The plate 85 is in effect an armature and can swing in a vertical plane parallel to lever arm 80 when free to do so.

Mounted on the platform 46 is a magnetic unit 86 comprising a flat base 87 of nonmagnetic material, such as hard fiber board, held down on the platform by screws 88 which pass through the slots 47 and 48, see Figs. 3 and 4. A permanent magnet 89 capable of exerting a given holding force and having upstanding poles 90 and 91 rests on the base 87 and a retainer 92 held in place by screws 88 as shown in Fig. 4 has a part 93 thereof passing between the poles. The retainer is also preferably made of nonmagnetic material. The magnet is firmly locked in position on the platform by the nonmagnetic parts 87 and 92 and screws 88, but the latter can be loosened to permit adjustment of the magnetic unit along the platform toward and from the pivot of the third lever means.

The stud 95 which provides the pivotal support for the picker stick is shown in Figs. 7 and 9. This stud is freely received by the open slots 50 in which it is confined by the short stud arms 66 and extends across the space between plates 37 and 38 and through the bearing hole 96 in the stick. Referring to Fig. 9, motion of the stud to the left is limited by plate 37, or more particularly stud 32 with which it aligns, while motion to the right is restricted by a snap ring 97 on the stud in position to engage plate 38.

The picker stick is returned to its normal position after a picking operation by a spring 100 one end of which is formed with an eye 101 to receive one end of a strap 102 secured to the stick at 103. The other end of the spring is connected to a holder 104 fastened in adjusted position along the rocker shaft. Spring 100 always exerts a force on the stick tending to move stud 95 out of bearing slots 50 but this tendency is resisted by the permanent magnet even during prolonged periods of idleness of the loom. When unrestrained by the short stud arms 66 the stud is free to move out of the open slots 50 in the direction in which the picking mechanism tends to move the stick either by action of spring 100 or the picking mechanism.

In describing the operation of the invention a description will first be given for normal picking conditions and this will be followed by a description of the operation when an abnormal picking condition arises.

Under usual conditions the parts will be in the position shown in Figs. 1, 2 and 5 with the armature 85 attracted to the permanent magnet 89. The magnet may be of a well-known Alnico type which has considerable strength and permanence and the magnet will attract the armature 85 with a given force which must be overpowered by an upwardly directed force exerted on the armature before the latter can be separated from the magnet. Under normal conditions the short stud arm 66 will hold the stud 95 in the open slot bearings 50, this result being accomplished by engagement of the cross bar 68 of the long arm of the first lever means 60 with the short arm 72 of the second lever, upward force exerted by the long arm of the second lever against the pins 72, and resistance to upward movement of the left-hand end of the lever arm 80 by the armature.

The arrangement of the first, second and third levers as shown effects a considerable multiplication of the force exerted by the magnet so that a magnet which can attract its armature with a force of less than 10 pounds, for instance, can enable the short arm 66 to withstand a force to the right, Fig. 5, on the stud 95 of approximately 400 pounds. Since this force would be sufficient for ordinary normal picking conditions the stud will be held confined in the slot 50 and the shuttle aligned with the lay propelled by the picking mechanism. It should be noted that the magnetic force and its attraction for the armature is the sole means for enabling the force transmitting system to retain the stud 95 in its normal position. No springs are utilized to hold these several parts in their normal position and the system is dependent upon the magnet for holding the stud in position. The reference to specific pound relations, as 10 to 400, is given as an example only and the invention is not to be limited to these figures or their ratio.

If abnormal conditions for picking exist the upper part of the picker stick will not be free to move in usual manner and the force of the picking mechanism will be exerted on the stud 95 to a larger extent than usual with the result that an excessive force will be brought to bear on the short arm 66 and this excess force when transmitted through the force transmitting system will be able to exert an upward force on the armature in excess of the given force exerted on it by the magnet. The armature will therefore be moved upwardly to some such position as that shown in Fig. 10, this upward movement being effected by a force transmitted from the stud 95 through the lever system and exerted on the armature. Under these conditions the second lever 70 will rock sufficiently to enable the cross bar 68 to move down into the slot 55 between the webs 42 and 45. This enables the lever means 60 to move from the full line position to the dotted line position, Fig. 10, which will rock the short arm stud 66 up high enough to permit escape of the stud from the slots 50 so that the stud and the stick can move from the full line to the dotted line position, Fig. 10, without breaking the stick.

After the condition which prevented normal picking has been corrected the parts can be restored by a simple operation requiring very little effort. The picker stick can be moved back to its normal position with stud 95 in the slots 50 while lever means 60 is in the dotted line position, Fig. 10, after which the lever means is moved to the full line position with the second lever 70 rocked in a counterclockwise direction, Fig. 10, sufficiently to enable the cross bar 68 to move about the short arm 72. The second lever will then be returned to its normal position and the arm 80, which may in fact have moved to the position to the right of that shown in Fig. 10, be moved back to its normal position with the pins 74 over the long arm 72 of the lever 70. With the levers thus positioned the operator moves the armature down toward the magnet and as soon as the magnet can exert its force on the armature the latter is drawn into close holding engagement with the magnet.

The magnet and the armature can be considered as two elements which tend to adhere to each other when in close engagement but which have little or no tendency to move toward each other when they are separated for any appreciable distance. Also, the one form of force transmitting system shown herein is not necessarily the only system which can be used, but it is desirable that a high degree of magnification of force be developed by the system between the armature or its equivalent and the stud retaining short arms 66.

From the foregoing it will be seen that the invention sets forth simple means for providing a yielding mounting for the pivot of a picker stick wherein the stick pivot is maintained in its normal position when a normal picking force is exerted by the picking mechanism due to the force transmitting system of which the armature can be considered a part. Simple magnetic means are sufficient cause of the force transmitting or conversion system to hold the stud 95 in the slots 50 under normal picking conditions, but when a force in excess of the normal picking force is exerted on the stud 95 by the picking mechanism then the transmitting system exerts such a force on the armature as is sufficient to overcome the attraction of the magnetic means. When the excess picking force overpowers the magnet the lever means 60 is free to turn from the full line to the dotted line position of Fig. 10 to permit escape or release of the stud 95 and movement of the stick without breakage. When the armature is pulled away from the magnet it is free to swing in a clockwise direction around pivot 76 without stretching any springs or in fact maintaining any sort of connection with the magnet.

The magnet is on the support means which provides pivots for the various levers of the force transmitting system and can be adjusted along the platform 46 along with a corresponding adjustment of the hanger 81 along arm 80 to vary the force exerted by the magnet on the arm 73 of the second lever by the pins 74. The platform can also be adjusted vertically with respect to the support means. The setting operation can be done either with spring 100 connected to the stick or disconnected from it by slipping the strap out of the eye 101.

Having now particularly described and ascertained the nature of the invention and in what manner the same is to be performed, what is claimed is:

1. In a loom provided with picking mechanism, a picker stick operatively connected to the mechanism for actuation thereby, a stud providing a pivot for the stick, a magnetic means capable of exerting a given holding force, and a system of force transmitting parts one of which is magnetic caused by attraction of said one part by the magnetic means to hold the stud in substantially stationary position when the mechanism exerts a normal picking force on the stick, said magnetic means being ineffective to attract said one part and causing said system to be unable to hold the stud when the mechanism exerts a force in excess of said normal picking force on the stick, whereupon the stud moves away from said position to prevent breakage of the stick and to cause movement of said one part away from said magnetic means whereby the effectiveness of said given holding force on said one part diminishes as the stud moves away from said stationary position.

2. The structure set forth in claim 1 wherein the magnetic means provides the only force causing the system to hold the stud stationary and said one part is an armature which becomes detached from and moves freely away from the magnetic means when the mechanism exerts said excess force.

3. In a loom provided with picking mechanism, a picker stick operatively connected to the mechanism for actuation thereby, a stud providing a pivot for the stick, support means provided with a pair of nonclosing open slots receiving said stud in nonclamping relationship therein and opening in the direction in which the mechanism moves the stick, two elements, one fixed to said support means, normally coupled to each other in close engagement and when thus coupled attracting each other and requiring a given force to separate them, said elements when separated having negligible attraction for each other, and a system of force transmitting parts on said support means operatively connected to the other element incapable of exerting said given force on the other element and effective to hold the stud in said slots when the mechanism exerts a normal picking force on the stick, the mechanism when exerting a force in excess of said normal picking force on the stick causing the system to transmit from the stud to said other element a force in excess of said given force, whereupon the other element separates from said one element and the system is incapable of holding the stud in the slots and the stud moves out of the slot to prevent breakage of the stick.

4. The loom set forth in claim 3 wherein said one element is a magnetic means and said other element is an armature for the magnetic means and is operatively connected to said force transmitting system.

5. In a loom provided with picking mechanism to actuate a picker stick, a stud providing a pivot for the stick, bearing means for the stud including an open-end slot and a bearing part which when in normal position closes said open-end slot and holds the stud in normal position, said bearing part being movable from the closed or normal position thereof to permit escape of the stud from the bearing means, two separable magnetic elements tending when in mutual engagement to adhere to each other in normal position with a given force, one of said elements when acted on by a force greater than said given force separating from the other element to an abnormal position and having a negligible tendency to return to normal position, and a system of force transmitting parts operatively connecting said one bearing part and said one element effective due to adherence of said elements to each other to hold said one bearing part in normal position when said mechanism exerts a normal picking force on the stick, said one element when the mechanism exerts an excess force on the stick having said greater force exerted thereon by the system of parts and moving to said abnormal position and being incapable of causing said system of parts to hold said one bearing part in the normal position thereof, whereupon the stud escapes from the bearing means to prevent breakage of the stick.

6. In a loom provided with picking mechanism and a rocker iron oscillating with a lay, a picker stick operatively connected to said mechanism, a stud providing a pivot for the lower end of the stick, support means fixed to the rocker iron provided with a slot receiving said stud and opening generally in the direction in which the mechanism applies picking force to the stick, a lever pivoted on said support means having a short stud arm normally confining the stud in said slot and having a longer arm, a second lever pivoted on said support means having a short arm normally supporting the long arm of the first lever and having a longer arm, a third lever pivoted on the support means having a part for engagement with said longer arm of the second lever, a permanent magnet, an armature normally held to the magnet by magnetic force but separable therefrom and operatively connected to the third lever and normally acting through said part of the third lever, the second lever and the long arm of the first lever to enable said short arm of the first lever to maintain the stud in said slot when a normal picking force is exerted on the stick by said mechanism, said stud when the stick is subjected to a force in excess of said normal force by the mechanism causing said levers to exert on said armature a force greater than said magnetic force, whereupon the armature separates from the magnet with resultant turning of said levers and movement of said short stud arm to enable the stud to move out of said open slot to prevent breakage of the stick by said excess force.

References Cited in the file of this patent

UNITED STATES PATENTS

| | | |
|---|---|---|
| 742,695 | Marcy | Oct. 27, 1903 |
| 2,499,256 | Payne | Feb. 28, 1950 |
| 2,525,776 | Crompton | Oct. 17, 1950 |
| 2,527,385 | Alix et al. | Oct. 24, 1950 |